Figure 1:
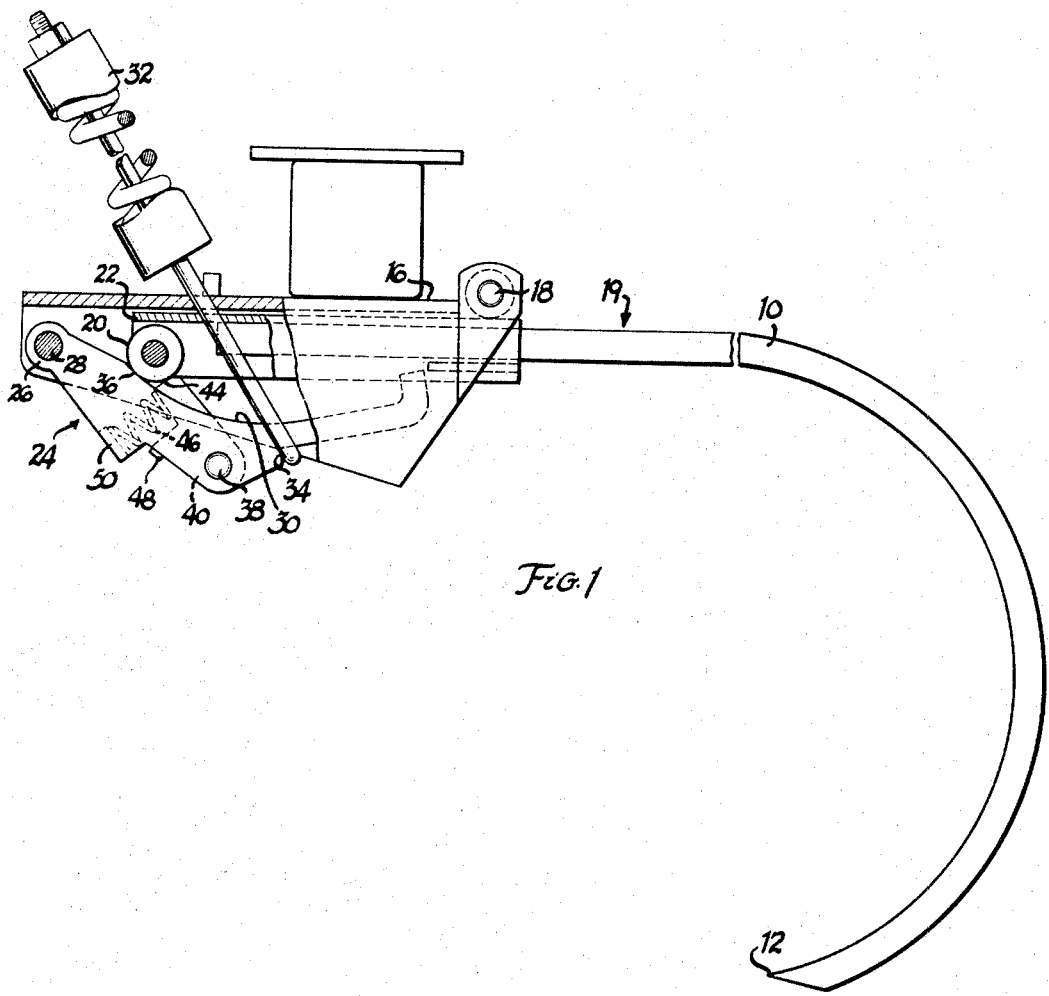

Dec. 10, 1968   M. P. CAFFERTY ET AL   3,415,326
CHISEL PLOW RESETTING MEANS
Filed May 12, 1966   2 Sheets-Sheet 1

Inventors
MICHAEL P. CAFFERTY
DONALD E. JEWELL
By Wilson, Settle, Batchelder
ATT'YS. & Craig Inventors
MICHAEL P. CAFFERTY
BY DONALD E. JEWELL
Wilson, Settle, Batchelder
ATTYS. & Craig

United States Patent Office 3,415,326
Patented Dec. 10, 1968

3,415,326
CHISEL PLOW RESETTING MEANS
Michael P. Cafferty and Danold E. Jewell, Rockford, Ill., assignors to J. I. Case Company, Racine, Wis., a corporation of Wisconsin
Filed May 12, 1966, Ser. No. 549,718
6 Claims. (Cl. 172—269)

This invention relates generally to a soil engaging agricultural implement that lifts out of the soil when it hits an obstruction, and returns to the soil when it passes the obstruction. More specifically, this invention relates to implement resetting means that continues to raise the implement after an initial peak of force-urging ground engagement is overcome, and subsequently, with a lesser but substantially constant force, returns the implement to the ground in its original working position.

Many different attempts have been made in the past to protect implements from damage due to hitting soil embedded obstructions, while working the soil in as continuous a manner as possible.

One such attempt has been to mount a soil engaging element on a flexible arm to allow movement around small stones. This solution is not suitable where large obstructions are encountered, or at relatively high cultivating speeds, or in relatively compact soil.

Another attempt has been to apply force towards ground engagement of an implement through an overload linkage or a frangible pin. When a sufficiently large obstruction is hit, the overload linkage is actuated or the pin is broken, releasing the force on the implement. In order for soil working by the implement to continue, the overload linkage must be reset or the pin must be replaced after each actuation. This solution is not suitable where a large number of obstructions are encountered, or where continuous uninterrupted working of the soil is particularly desired, such as in gang plowing.

Most modern devices now attempt to automatically reset the ground engaging element after it has been displaced from its normal working position. This is particularly true where a spring imposes a threshold force tending to hold the ground engaging element in its normal working position in the soil. Typically, at a preselected threshold of force on the ground engaging element, a spring is deflected, which allows a force on the implement to raise the element a distance substantially in proportion to the amount of force exerted on the element. After the obstruction is passed, an attempt is made to reset the element into the soil.

In typical arrangements of this type, the force on the ground engaging element during resetting varies substantially with the position of the element, and reaches values at some time during resetting that are substantially greater than during most of the previous release cycle. In one such arrangement, this results in a larger force being exerted on the implement to initiate the resetting cycle than at the completion of resetting into the normal working position. In another arrangement, where a threshold peak of force must be overcome in order to release the implement from the soil, peak of force must also be overcome in order to negotiate resetting of the implement into the normal working position.

In the present invention, a soil engaging implement is provided with a release and resetting mechanism that comprises a soil engaging element attached on one end of a medially pivoted implement shank. A roller is on the other end of the shank. A spring urges a cam surface of a pivotable arm into contact with the roller, and a latch on the arm also engages this roller. When an obstruction is hit with force greater than a preselected threshold value, the shank is pivoted about its fulcrum. This tends to pivot the arm against the force of its spring.

The latch cooperates with the arm to (1) reduce from the threshold value the force necessary to move the element away from the obstruction and (2) subsequently to reduce further and to hold substantially constant the force necessary for resetting the element into the original ground engaging position.

It is an object of this invention to provide a ground engaging implement with an improved release and resetting mechanism that releases a ground engaging element of the implement from the soil when a predetermined threshold tripping force is applied to the element, and subsequently return the ground engaging element to the normal working position without having to overcome the threshold force.

Another object of this invention is to provide a trip release or overload release for a ground engaging implement, wherein the implement is tripped only after an initial or threshold force is attained, and the implement is returned to ground engagement without the necessity of directly overcoming the initial or threshold force.

Other objects of this invention will appear in the following description and appended claims, reference being had to the accompanying drawings forming a part of this specification.

Figure 4:
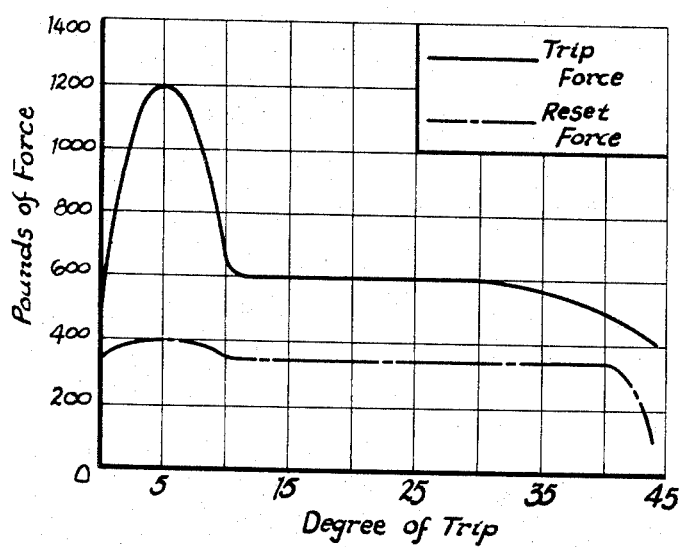
Figure 2:
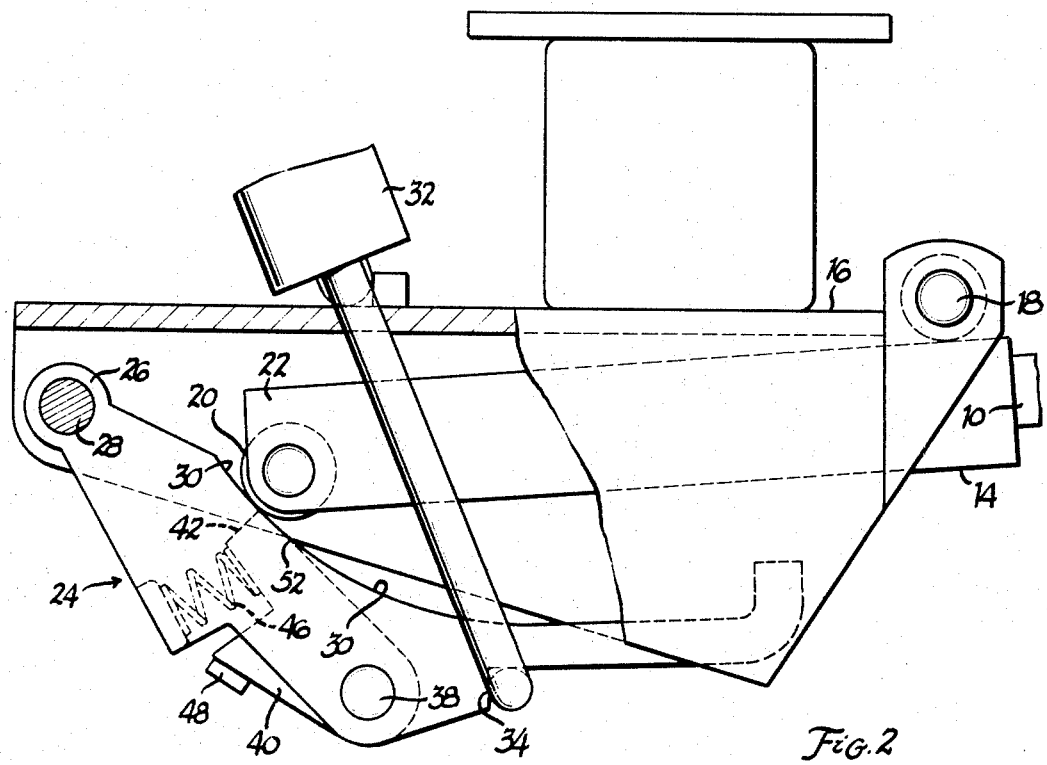
Figure 3:
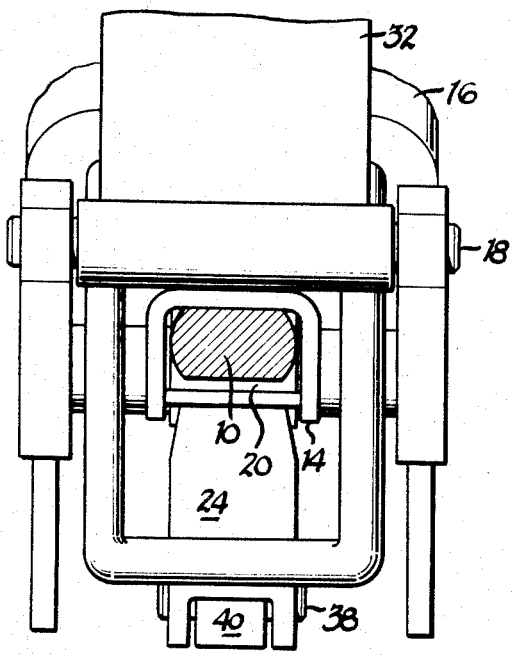

On the drawings:
FIGURE 1 is a partial transverse sectional view of a preferred embodiment of the present invention;
FIGURE 2 is a partial transverse sectional view of a portion of the apparatus shown in FIGURE 1, with the shank raised from the soil engaging position of FIGURE 1;
FIGURE 3 shows, in a partial cross-sectional view, a portion of the apparatus shown in FIGURE 1; and
FIGURE 4 shows a graph of the force on the plow end of the shank, plotted against the degree of trip of the shank.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

As shown on the drawings:
In the preferred embodiment of this invention, a hook-shaped standard or shank member 10 has one end 12 that is a chisel shaped plow or ground engaging element. The shank 10 has a bent or hook shape so that its other end 22 is forward of and above the ground engaging end 12. Near this other end 22 the shank is rigidly secured to an enclosing open ended box-shaped sleeve 14.

The sleeve 14 is pivotally attached to a supporting member 16. This pivotal attachment is obtained by means of a pin 18 passing through the sleeve and supporting member. The sleeve 14 and the shank 10 act as a lever 19 having a fulcrum at the pin 18. A roller 20 is journaled on the forwardmost portion of the sleeve 14.

An arm 24 has one end 26 pivotally attached to the supporting member 16 by a pin 28 passing through the arm 24 and supporting member 16. The upper surface 30 of the arm constitutes a cam engaging the shank roller 20. This camming engagement is maintained by a spring 32 bottomed on the member 16 applying force at a notch 34 in the undersurface of the arm. Thus, spring 32 urges the arm in a counterclockwise direction about the pin 28, to forcibly engage the roller 20 with the cam surface 30.

THE LATCH

The latch member 40 is pivotally secured to the arm 24 by a pin 38 at a medial portion of the arm 24.

The latch member 40 projects forwardly from the pin 38 and has an abutment surface 42 engageable with the roller 20, when the implement is in its normal position of FIGURE 1. The roller 20 and the latch surface 42 are in forced engagement at a point 44 under the bias of the spring 32.

The latch member 40 is urged in a clockwise direction about the pin 38 by a spring 46. This rotation raises the latch above the cam surface 30 for the above described engagement with the roller. As shown in FIGURE 1, this rotation is limited by a projection 48 on the latch, with the undersurface 50 of the arm 24.

The latch member 40 also has a surface 52 extending rearward and downward from its surface 42. The surface 52 form a gentler slope with the cam surface 30 than surface 42 when the latch member is extended above the cam surface. Thus, as more fully explained below, a gentler slope is provided on the latch for the roller 20 to initially engage during a resetting cycle, than the initial engagement of the roller with the latch during a release cycle of operation.

The latch member 40 and the arm 24 cooperate together with the roller 20 to exert a ground engaging force on the implement shank during the release or trip cycle of operation, and during reset cycle of operation. The value of this force at different positions during both tripping and resetting is shown in FIGURE 4. The trip force there shown, as well the reset force, corresponds directly to the moment on the lever 19.

OPERATION

From the above description, it can be appreciated that the force on the soil engaging element 12 towards normal working soil engagement is provided by the moment on the lever 19. At the initiation of the release or trip cycle of operation, the force on the shank 19 to provide this moment is applied at the roller 20 through its contact with the cam surface 30 and the latch surface 42. This force is induced by the spring 32 urging the arm 24 about the pin 28.

At the initiation of the release cycle of operation, upward travel of the ground engaging element is resisted by a sharply increasing moment applied to the lever 19. The sharp increase of this moment is indicated by the steep rise of trip force between 0° and 5° of trip plotted on the graph of FIGURE 4.

The moment on sleeve 14 about pin 18 increases sharply with the initial tripping of the ground engaging element 12 from the soil because of the latch 40. The latch obviously must be depressed before the shank can pivot about pivot axis 18.

When the implement is in the normal position, the surface 42 of the latch 40 contacts the roller 20. As the ground engaging element is raised, the shank 19 turns counterclockwise above the pivot 18 to pivot the arm 24 in a clockwise direction against the biasing force of the spring 32. Only when the arm 24 pivots can the shank 19 be moved to elevate the tool point 12 from the soil. Obviously, the roller 20 can traverse the cam surface 30 only after the latch 40 has been depressed and the latch pivoted in a counterclockwise direction to its position of FIGURE 2, at which the latch surface 42 lies beneath the cam surface 30. The resistance of the latch 40 is primarily a function of the angularity and the height of the surface 42, and only secondarily a function of the compression force of the spring 46.

The resistance offered by the latch 40 is shown by the graph of FIGURE 4. When a force of 1200 pounds is exerted at the tool point 12, the latch 40 assumes the position of FIGURE 2, and the resistance of the spring assembly 32 and the arm 24 drops to a value of 600 pounds.

Thus, the latch imposes a high initial or breakout resistance force to the shank, which force drops to a much lesser subsequent tool moving force.

As soon as the obstruction is passed, the force on the shank 10 is reduced, and the reset cycle of operation is initiated. During the restting cycle, a substantially constant reset force is applied to the ground engaging element through movement of the shank 10 about the pivot 18. This constant force is due to the shape of the cam surface 30, and the force is illustrated by the dot-dash line in FIGURE 4. As the implement lowers during the resetting cycle, the rear latch surface 52 is engaged by the roller. But the slope of this surface with respect to the cam surface 30 is so gentle, and the force of the spring 46 is so small, that no significant increases in reset force is obtained during the remainder of the resetting cycle. At the conclusion of the resetting cycle, the device is positioned as shown in FIGURE 1.

SUMMARY

From the preceding description of the structure and operation of the present invention, it can be appreciated that a sharp peak of trip force must be overcome in order to initiate the trip cycle through the first few degrees of trip. After this peak is reached, the trip force is sharply reduced to a level which is held virtually constant throughout the remainder of the trip cycle. Despite this sharp peak of force that must be overcome to release the ground engaging element from the soil during the trip cycle, resetting is achieved with virtually a constant force throughout, until the original working, ground engaging position of the implement is achieved. Not only is resetting accomplished with a virtually constant force, which is significant to the smooth operation of the resetting cycle, but at the end of the resetting cycle the ground engaging element is forced into and held in the working position by a significant amount of force.

By the practice of this invention only the hitting of solid obstructions that can really cause damage to the implement can overcome the threshold of force necessary to initiate the trip cycle. Thus, continuity of cultivation is achieved without interruption by only a slight jar. After the threshold of force is achieved, the release of the implement is continued at a much lesser and substantially constant force so that the ground-engaging element is virtually swung away from the obstacle. The entire cycle of resetting is accomplished at a lesser and substantially constant force.

We claim:

1. In an apparatus for lifting a soil engaging element out of a normal soil engaging working position and subsequently resetting said element to said normal position, said apparatus including implement means pivotal about a point located forwardly of said element and including a downwardly projecting shank portion mounting said soil engaging element, a roller journaled on said implement means forward of said pivot point, an arm pivotal about a point forward of said roller and having a cam surface, and a first spring urging the cam surface into engagement with said roller, the improvement comprising a latch member, means pivotally mounting said latch member on said arm, and a second spring substantially weaker than the first spring biasing the latch member about said mounting means so that said latch member projects above said cam surface, said latch member coacting with said arm to initially oppose movement of said implement means and said soil engaging element out of working position.

2. The improvement of claim 1 wherein said latch member has a first surface engageable with said roller when said element is in said normal position, said first surface projecting above said cam surface at a steep angle therewith, and said latch member has a second surface engageable with said roller during resetting of said element back into said normal position, said second surface proejcting above said cam surface at a gentler slope than said first surface; whereby force transmitted through contact between said latch and said roller is less when the roller is in contact with said second surface than said first surface.

3. In an overload mounting for a ground engaging implement of the type wherein an implement shank is pivotally supported by means swingable about a pivot axis transverse to the line of draft of the implement and wherein a spring biased lever is swingable about an axis parallel to and spaced from said pivot axis (1) to resist pivotal movement of said shank to hold the implement in engagement with the ground and (2) to urge the shank in a ground engaging direction after overload tripping of the implement, said lever having a cam surface progressively traversed by said swingable means as said swingable means pivots about its said pivot axis, the improvement comprising a latch pivotally carried by said lever and having an abutment surface interposed in the path of traversing movement of said swingable means, and spring means biasing said latch so that said abutment surface projects above the cam surface of said lever for engagement with said swingable means.

4. In an overload mounting as defined in claim 3, the further improvement of said abutment surface lying substantially normal to said cam surface and at a portion of said cam surface to be traversed by said swingable means prior to overload release of said ground engaging implement, said abutment surface thus imposing an initial resistance to movement of the implement shank which is additional to the resistance to such movement due to said spring biased lever.

5. In an overload mounting as defined in claim 4, the further improvement of said latch having another surface angularly related to said abutment surface and lying at an acute angle with respect to said cam surface, said additional surface being traversed by the swingable means as the spring biased lever returns the shank to its ground engaging position, the angular relation of said additional surface with respect to said cam surface resulting in the imposition of substantially no load on the return movement of said shank despite the presence of said latch.

6. In an overload mounting for ground engaging implement of the type wherein an implement shank is pivotally supported by means swingable about a pivot axis transverse to the line of draft of the implement and wherein a spring biased lever is swingable about an axis parallel to and spaced from said pivot axis to resist pivotal movement of said shank from its normal ground engaging position and to return the shank to its ground engaging position in the event of overload release, said lever having a cam surface progressively traversed by said swingable means as swingable means pivots about its said axis, the improvement comprising a latch having angularly related surfaces, one of said surfaces lying substantially normal to the surface of said cam and the other of said surfaces lying at an acute angle to the surface of said cam, spring means against which said latch can be moved relative to the lever so that said surfaces are depressed beneath the level of said cam surface, whereby the first latch surface imposes an initial appreciable resistance to movement of said swingable means along said cam surface to retain the implement in ground engaging position, and said second surface imposes substantially no resistance to the return of said implement to ground engaging position as said swingable means traverses said cam surface in the reverse direction.

References Cited

UNITED STATES PATENTS

| | | | |
|---|---|---|---|
| 2,707,425 | 5/1955 | Charley | 172—269 |
| 3,365,002 | 1/1968 | Jacobs | 172—269 |

ABRAHAM G. STONE, *Primary Examiner.*

J. PETERSON, *Assistant Examiner.*